(12) United States Patent
Nuzman et al.

(10) Patent No.: US 9,136,907 B2
(45) Date of Patent: Sep. 15, 2015

(54) VECTORING FOR LOW POWER MODES

(71) Applicant: Alcatel Lucent, Paris (FR)

(72) Inventors: Carl J. Nuzman, Union, NJ (US); Jochen Maes, Veerle (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/175,398

(22) Filed: Feb. 7, 2014

(65) Prior Publication Data

US 2015/0229354 A1 Aug. 13, 2015

(51) Int. Cl.
*H04B 3/00* (2006.01)
*H04L 25/00* (2006.01)
*H04B 3/32* (2006.01)

(52) U.S. Cl.
CPC ........................................ *H04B 3/32* (2013.01)

(58) Field of Classification Search
CPC ........................................................ H04B 3/32
See application file for complete search history.

(56) References Cited

U.S. PATENT DOCUMENTS

2005/0220200 A1* 10/2005 Giannakis et al. ............ 375/260
2014/0233457 A1* 8/2014 Koutsimanis et al. ........ 370/328

OTHER PUBLICATIONS

"Self-FEXT cancellation (vectoring) for use with VDSL2 transceivers," *Series G: Transmission Systems and Media, Digital Systems and Networks, ITU G.993.5*, Apr. 2010.
Lantiq et al., G.Fast: Proposal for Working Text on Low Power Mode L2.1, ITU—Telecommunication Standardisation Sector, Geneve, Switzerland, Dec. 2-6, 2013.

* cited by examiner

*Primary Examiner* — Erin File
(74) *Attorney, Agent, or Firm* — Harness, Dickey & Pierce, P.L.C.

(57) ABSTRACT

In one embodiment, the method includes determining, at an access node, a precoder matrix for precoding transmission from the access node to a plurality of downstream devices over a plurality of lines. The plurality of lines include high power lines and low power lines. The high power lines are in active communication and transmit more symbols per frame than the low power lines. The method further includes precoding a signal vector using the precoder matrix regardless of the symbols the signal vector is sending over the low power lines. Here, the determining determines the precoder matrix such that the precoding does not mitigate the cross-talk effect the high power lines have on the low power lines. The method also includes transmitting over the plurality of lines based on the precoded signal vector.

7 Claims, 4 Drawing Sheets

VECTORING FOR LOW POWER MODES

BACKGROUND OF THE INVENTION

At least one new standard hopes to raise the maximum link speed over telephone lines to 1 Gbps, using 106 MHz of bandwidth. At these higher frequencies, cross-talk between the dozens of copper wires (called lines) in a bundle will be an issue. The use of low power modes where no or only few symbols are sent over some of the lines adds further complexity to the cross-talk issue.

SUMMARY OF THE INVENTION

At least one embodiment relates to method of transmitting.

In one embodiment, the method includes determining, at an access node, a precoder matrix for precoding transmission from the access node to a plurality of downstream devices over a plurality of lines. The plurality of lines include high power lines and low power lines. The high power lines are in active communication and transmit more symbols per frame than the low power lines. The method further includes precoding a signal vector using the precoder matrix regardless of the symbols the signal vector is sending over the low power lines. Here, the determining determines the precoder matrix such that the precoding does not mitigate the cross-talk effect the high power lines have on the low power lines. The method also includes transmitting over the plurality of lines based on the precoded signal vector.

In one embodiment, the precoding uses the precoder matrix for both a first slot type and a second slot type. The first slot type is a time slot of a frame during which high power and low power lines in the plurality of lines are permitted to communicate, and the second slot type is a time slot of the frame during which high power lines only are permitted to communicate.

In one embodiment, the determining determines the precoder matrix such that the precoding does not mitigate the cross-talk effect the low power lines have on each other.

In one embodiment, the determining determines the precoder matrix such that the precoding mitigates the cross-talk effect the low power lines have on the high power lines, and mitigates the cross-talk effect the high power lines have on each other.

At least one embodiment relates to a method for receiving.

In one embodiment, the method includes receiving, at an access node, a signal vector over a plurality of lines. The plurality of lines include high power lines and low power lines. The high power lines are in active communication and transmit more symbols per frame than the low power lines. The method further includes determining, at the access node, a postcoder matrix; and postcoding the signal vector using the postcoder matrix or a submatrix thereof regardless of whether the signal vector indicates the low power lines are communicating. Here, the determining determines the postcoder matrix such that the postcoding does not mitigate a cross-talk effect the low power lines have on the high power lines.

In one embodiment, the postcoding uses the postcoder matrix for both a first slot type and a second slot type. The first slot type is a time slot of a frame during which high power and low power lines in the plurality of lines are permitted to communicate, and the second slot type is a time slot of the frame during which high power lines only are permitted to communicate.

In one embodiment, the determining determines the postcoder matrix such that the cross-talk effect the high power lines have on each other is mitigated during the second slot type.

In one embodiment, the determining determines the postcoder matrix such that the cross-talk effect the high power lines have on low power lines is mitigated during the first slot type.

In one embodiment, the determining a postcoder matrix includes determining a low power line scaling matrix and determining the postcoder matrix based on the low power line scaling matrix. The determining determines the low power line scaling matrix such that the cross-talk effect of the low power lines on the high power lines remains below a desired threshold.

In one embodiment, the desired threshold is based on noise at the access node.

At least one embodiment relates to an access node.

In one embodiment, the access node includes a memory configured to store a precoder matrix, and a controller configured to determine the precoder matrix for precoding transmission from the access node to a plurality of downstream devices over a plurality of lines. The plurality of lines includes high power lines and low power lines. The high power lines are in active communication and transmit more symbols per frame than the low power lines. The controller is configured to precode a signal vector using the precoder matrix regardless of the symbols the signal vector is sending over the low power lines, and to transmit over the plurality of lines based on the precoded signal vector. The controller is configured to determine the precoder matrix such that the precoding does not mitigate the cross-talk effect the high power lines have on the low power lines.

In another embodiment, the access node, includes a memory configured to store a postcoder matrix, and a controller configured to receive a signal vector over a plurality of lines. The plurality of lines include high power lines and low power lines. The high power lines are in active communication and transmit more symbols per frame than the low power lines. The controller is configured to determine the postcoder matrix, and to postcode the signal vector using the postcoder matrix or a submatrix thereof regardless of whether the signal vector indicates the low power lines are communicating. The processor is configured to determine the postcoder matrix such that the postcoding does not mitigate a cross-talk effect the low power lines have on the high power lines.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
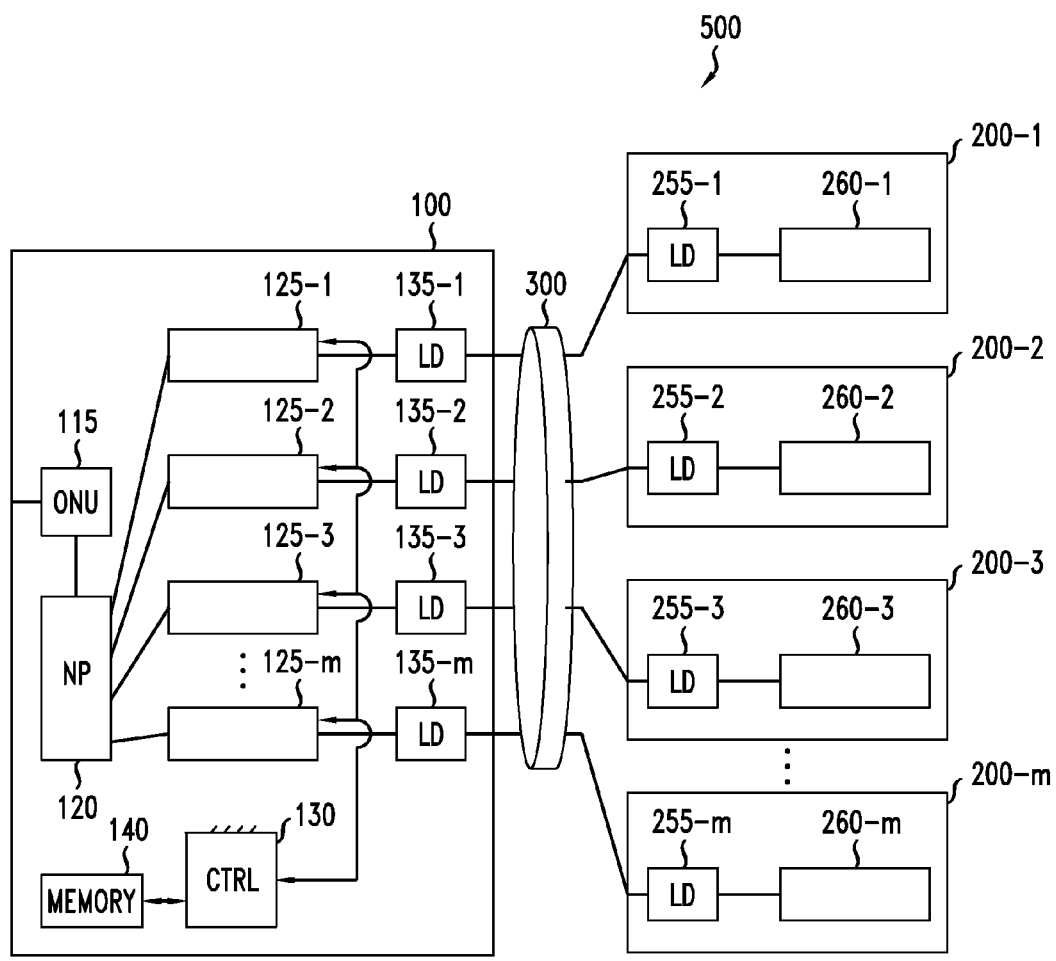
FIG. 1 illustrates a communication network according to an example embodiment.

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

FIG. 1 illustrates a communication system according to an example embodiment. As shown in FIG. 1, the system 500 includes a distribution point or access node 100 and Customer Premises Equipment (CPEs) 200-1 to 200-M, where M may be an integer greater than 1.

The access node 100 may be under control of an operator. The access node 100 includes an optical network unit (ONU) 115 configured to communicate with a network processor (NP) 120. As is known, the ONU 115 provides a high-bandwidth data connection over a fiber optic channel to an optical line terminal (OLT) located in a central office. The ONU 115 passes received downstream data frames or packets to the NP 120, which then determines the destination for the frames or packets and accordingly forwards them to an appropriate interface (e.g., DSL, ADSL, G.fast, etc. interface). Similarly, in the upstream direction, the NP 120 forwards frames or packets from the interfaces to the ONU 115.

The NP 120 provides signals to processing devices 125-1 to 125-M. The processing devices 125 are configured for point-to-point communication.

The access node 100 further includes a controller 130. The controller 130 is configured to receive signal data collectively referred to as a signal vector from the processing devices 125. The signal data may include signal values intended to be received by corresponding processing devices 260-1 to 260-M in the CPEs 200. In the downstream direction, the controller 130 is also configured to precode the signal vector, and send the resulting data back to the processing devices 125 for transmission to the CPEs 200. The processing devices 125 then send the precoded signal data over respective lines 300 via respective line drivers 135-1 to 135-M. In the upstream direction, the processing devices 125 receive crosstalk-contaminated signals from the line drivers 135. The controller 130 receives the crosstalk-contaminated signals (collectively referred to as received signal vector) from the processing devices 125, postcodes the received signal vector, and provides the processing devices 135 with the post-compensated signal data. The processing devices 125 then continue to process the signal data to demodulate the intended upstream information.

Generally, the data exchanged between processing devices would be frequency-domain samples, but alternatively the data could be represented as time-domain samples, for example.

As discussed above, the controller 130 communicates with the processing devices 125. Alternatively, the controller 130 may be between the processing devices 125 and the respective line drivers 135-1 to 135-M. Thus, the location of the controller 130 is not limited to the location shown in FIG. 1.

Furthermore, it will be understood that the access node 100 may include a memory, or multiple memories. The NP 120, the controller 130, and/or the processing devices 135 execute programs and/or program modules stored on the memory to perform their respective functions and the functions of the access node 100. The operation of the access node 100 will be described in greater detail below with respect to some example embodiments. The memories may be external to and/or internal to the NP 120, the controller 130, and/or the processing devices 135. For the purposes of simplicity of illustration only, only a memory 140 associated with the controller 130 is shown.

As discussed above, each of the processing devices 125 may communicate with a respective one of the CPEs 200 over the communication lines 300 through an associated line driver 135. The lines 300 (also referred to as links) may be telephone lines (e.g., twisted copper pairs), and the CPEs 200-1 to 200-M may be modems or other interface devices operating according to a communication standard for transmitting data over telephone lines. The CPEs 200-1 to 200-M may be located in various customer premises. Each of the CPEs 200-1 to 200-M includes a line driver 255-1 to 255-M and respective processing devices 260-1 to 260-M. Each of the line drivers 255 may be the same or substantially the same as the line drivers 135.

Next, some example embodiments will be described. In the description, we assume that time is divided into frames, with each frame further divided into slots. Within each frame, there are two types of slots:

Slots in which all lines are allowed to communicate (typically one slot per frame)—referred to as a first type Slots in which only high power lines are allowed to communicate—referred to as a second type High or full power lines are those lines 300 in active communication. However, other lines 300, referred to as low power lines, may be in a power savings mode. For these low power lines, most symbols are quiet (e.g., no transmission), and only a small number of symbols per superframe (e.g., a desired number of consecutive frames) are sent for maintaining overhead information and/or vectoring. Namely, high power lines send more symbols per frame than low power lines. Furthermore, throughout this disclosure, we use block matrix notation, with subscript F representing high or full power lines (e.g., L0 in the G.fast standard) and subscript L representing low power lines (e.g., L2.1/L2.2 in the G.fast standard).

Downstream Methods

First downstream communication from the access node 100 to the CPEs 200-1 to 200-M will be described. The basic downstream model for one tone is:

$$y=P(HCx+z) \quad (1)$$

where y diagonal matrix, P is the frequency-domain equalizer (FEQ), H is the N×N channel matrix, C is the N×N precoder matrix, x is the signal vector indicating the symbols to send over the lines 300 (each element of the vector associated with a respective line in lines 300), and z is a noise vector. It is also useful to use the notation H=D(I+G) where D is the diagonal matrix of direct gains and may be estimated using any well-known method or derived from the channel matrix H, I is the identity matrix, and G is the cross-talk matrix modeling the cross-talk noise between power lines. As will be appreciated, the channel matrix H may be estimated according to any well-known method.

Symmetric (all-to-all) Vectoring

When all lines are active, we typically use a diagonalizing precoder $C=H^{-1}S$ where S is a diagonal matrix of scale values chosen to ensure that C satisfies row power constraints. Namely, S indicates the transmission power for the lines in the link 300. Again, determining the value of S may be accomplished according to any well-known method. As will be appreciated, the values of S may depend on which lines are scheduled for transmission, and the scheduling may be performed according to any well-known method. The frequency equalizer may be zero-forcing or MMSE—typically these are similar. For simplicity, we assume zero-forcing, P=inv(diag (HC)), which in this case gives $P=S^{-1}$. This results in $y=x+S^{-1}z$.

See definitions in next section for active, idle, and quiet symbols.

All to all vectoring may be accomplished by the access node 100, and in particular, the controller 130 of the access node 100 by executing program instructions stored in memory. Accordingly, the controller 130 is configured as a special purpose machine to:

1. Determine an N×N precoder $C'=H^{-1}S'$, with S' chosen according to well-known methods to ensure that row sums of squared elements of C' are not larger than 1.
2. Determine an F×F precoder $C''=H_{FF}^{-1}S''$, with S'' chosen according to well-known methods to ensure that row sums of squared elements of C'' are not larger than 1.
3. Choose a combined scale matrix S, with $S_k=\min(S'_k, S''_k)$ for high powered lines k, and $S_m=S'_m$ for low powered lines.
4. During time slots in which all lines are allowed to communicate, use N×N precoder $C_A=H^{-1}S$ to precode symbols of all lines. Transmit active or idle symbols on all lines in this case.
5. During time slots in which only high power lines are allowed to communicate, use F×F precoder $C_B=H_{FF}^{-1}S_F$ to precode symbols of high power lines only.

The access node 100 then transmits active or idle symbols on high power lines, and quiet symbols on low power lines in this case.

As will be appreciated, at least two precoder matrices $C_A$ and $C_B$ must be determined and stored. Furthermore, if the set of high power lines changes, then the precoder matrices $C_A$ and $C_B$ must be recomputed and stored.

Asymmetric Vectoring for Downstream

When low power lines are present, we want to be able to turn off the transmitter of a low power line during symbols for which the corresponding CPE 200 is not being sent a symbol. We will use the following terminology for symbols on line k:

active symbol—symbol in which line k has information to convey (input k of precoder is non-zero)

idle symbol—symbol in which line k has no information to convey, but a symbol consisting of compensation signals is transmitted for crosstalk cancellation purposes (i.e., input k of precoder is zero, but output k is non-zero). For example, for the purposed of channel estimation, etc.

quiet symbol—symbol in which transmitter of line k is not active (output k of precoder is zero).

In order to save power on low power lines, it is desired to have as many quiet symbols as possible, as opposed to idle symbols. This is because the analog front end of the transmitter can go into a power saving state during quiet symbols, but must remain in its active state during idle symbols. When using symmetric precoding, the precoder matrix has to be changed depending on the set of active lines for a given symbol. To avoid this, we can consider using asymmetric vectoring, in which high or full power lines are protected from low power lines, but not vice versa.

We define the precoder or precoding matrix C of the form:

$$C = \begin{bmatrix} C_{FF} & C_{FL} \\ C_{LF} & C_{LL} \end{bmatrix} = \begin{bmatrix} H_{FF}^{-1}D_F S_F & -H_{FF}^{-1}H_{FL}S_L \\ 0 & S_L \end{bmatrix} \quad (2)$$

where maximum values of the scaling matrices $S_F$ and $S_L$ are selected to ensure that the row power of rows in C do not exceed 1, $C_{FF}$ represents the portion of the precoder C canceling or mitigating cross-talk effect between full power lines, $C_{FL}$ represents the portion of the precoder C canceling or mitigating the cross-talk effect of low power lines on full power lines, $C_{LF}$ represents the portion of the precoder C canceling or mitigating the cross-talk effect of high power lines on low power lines, and $C_{LL}$ represents the portion of the precoder cancelling or mitigating the cross-talk effect of low power lines on low power lines. As will be appreciated, by setting $C_{LF}$ to a zero matrix, the precoder C does not cancel or mitigate the cross-talk effect full or high power lines have on low power lines. Also, the scaling matrix $S_L$ may be set to the identity matrix, or some other diagonal matrix, such that the precoder C does not cancel or mitigate the effect low power lines have on each other. (In one example embodiment, $S_F$ and $S_L$ are both approximately identity).

This precoder C is suitable for simplified discontinuous operation on the part of the low power lines, because the rows corresponding to low power lines do not have compensation signals, because only the diagonal element of each such row is non-zero. Hence symbols on low power lines are either active or quiet; there are no idle symbols. This allows different levels of power savings on different lines if needed. For example, a short line in low power mode may need to send only one symbol per superframe, while a longer line may need to send two.

The resultant channel, before equalization, is:

$$R = HC = \begin{bmatrix} D_F S_F & 0 \\ H_{LF}H_{FF}^{-1}D_F S_F & (H_{LL} - H_{LF}H_{FF}^{-1}H_{FL})S_L \end{bmatrix} \quad (3)$$

The full-power lines obtain a crosstalk free channel with direct gain $D_F S_F$ (i.e. ideal vectored performance). The low power lines obtain essentially non-vectored performance.

The bitloading of low power symbols can be selected to handle the worst case interference obtained when all low power lines are active. The low power lines can then operate discontinuously—i.e. arbitrary subsets of low power lines can be made quiet without affecting other lines. In the above expressions, a quiet symbol on low power line k can be represented by setting the k-th element of $S_L$ to zero. Low power lines with lower bit-loading than others can use more symbols per super-frame as needed: in this way different lines may achieve different levels of power saving.

Another aspect of the approach is that no error feedback is required on low power lines during low power operation. Depending on transition requirements, some feedback may be required in a transition phase when transitioning from low power mode to full power mode.

Figure 2:
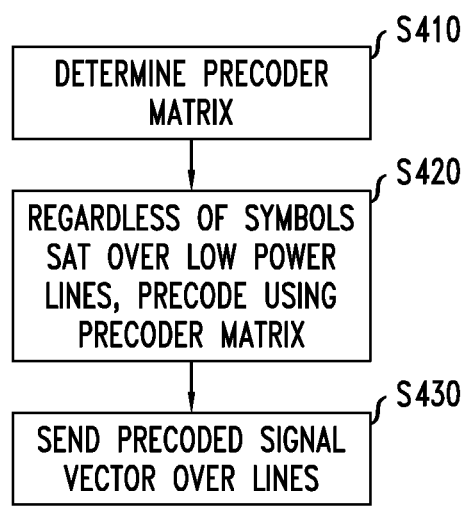
FIG. 2 illustrates a flow chart of this downstream asymmetric vectoring according to an embodiment.

FIG. 2 illustrates a flow chart of this downstream asymmetric vectoring according to an embodiment. For the purposes of description only, this embodiment will be described with respect to implementation on the system of FIG. 1.

As shown, asymmetric vectoring on the downstream may be accomplished by the access node 100, and in particular, the controller 130 of the access node 100 by executing program instructions stored in the memory 140. Accordingly, the controller 130 is configured as a special purpose machine to:

1. Determine a precoder matrix C as in equation (2) with $S_F$ and $S_L$ chosen using known methods to ensure that the row sums of squared elements of C do not exceed 1 in step S410 (e.g., $S_F$ and $S_L$ may be approximately identity matrices). The precoder matrix C may be stored in the memory 140 by the controller 130.
2. Regardless of whether active or quiet symbols are being sent over the low power lines, the controller 130 precodes the signal vector x using the precoder matrix C in step S420. For example, during time slots (first type) in which all lines are allowed to communicate, in step S420 the controller 130 uses precoder C to precode symbols for all lines. As another example, during time slots (second type) in which only high power lines are allowed to communicate, in step S420 the controller 130 uses precoder C to precode symbols for all lines.
3. Then, in step S430, the access node 100 transmits via the line drivers 135 (and optionally, the processing devices 125) the precoded signal vector Cx over the lines 300. The precoded signal vector Cx indicates the symbols to transmit over the lines 300. For example, the access node 100 transmits active or idle symbols on high power lines, and active or quiet symbols on low power lines during time slots of the first type. As another example, the access node 100 transmits active or idle symbols on high power lines, and quiet symbols (no transmission) on low power lines.

As will be appreciated, with asymmetric vectoring, only a single precoder matrix is computed and stored. The single precoder matrix is used for (i) slots in which all lines communicate and (ii) slots in which only high or full power lines communicate. Namely, regardless of whether the signal vector is sending active or quiet symbols over the low power lines, the same single precoder matrix is used. Accordingly, asymmetric vectoring requires significantly less memory and significantly less computation resources to implement than symmetric vectoring.

Full-to-Full Vectoring with Power Control

An alternative scheme is not to vector low power lines at all, i.e. to also set $C_{FL}$ to zero, but to use sufficiently low transmission power on the low power lines to prevent low power lines from impacting full-power lies. This is represented by precoder:

$$C = \begin{bmatrix} C_{FF} & C_{FL} \\ C_{LF} & C_{LL} \end{bmatrix} = \begin{bmatrix} H_{FF}^{-1} D_F S_F & 0 \\ 0 & S_L \end{bmatrix} \quad (4)$$

with resultant channel:

$$R = HC = \begin{bmatrix} D_F S_F & H_{FL} S_L \\ H_{LF} H_{FF}^{-1} D_F S_F & H_{LL} S_L \end{bmatrix} \quad (5)$$

In this case $S_F$ must be chosen to ensure row power of $C_{FF}$ does not exceed 1, while $S_L$ must be chosen small enough to ensure that the row powers in $H_{FL} S_L$ is negligible compared with the receiver noise on full power lines. Because of this low value of $S_L$, performance of low power lines will be lower than with the previous scheme, and more symbols per superframe will be required to obtain the minimum rate.

To control the interference from low power lines, we select a positive constant $\theta$, and then will choose $S_L$ to ensure that interference from low power lines to full-power line k is not greater than $\theta \sigma_k^2$, where $\sigma_k^2$ is the background noise. This guarantees that the SNR of line k does not decrease by more than 10 log 10 (1+$\theta$) dB due to this interference. It is useful to define the notation $\tilde{R}=RS^{-1}$ for the resultant channel obtained with unit scaling. In this notation, the bound on interference into full-power line k is:

$$\sum_{m \in L} |\tilde{R}_{km}|^2 S_m^2 \leq \theta \sigma_k^2 \quad (6)$$

There are a number of ways to find scale values $S_L$ that satisfy these bounds, allowing different tradeoffs between lines. In the upstream case discussed below, we seek to equalize the performance of the low power lines, since the power savings depend on the rate of the worst low power user. In the downstream direction, since the each line can in principle use a different number of symbols, the best power savings is achieved by minimizing the total number of symbols required over all low power lines. In one embodiment, we set a common scaling $S_m = \beta$ on all low power lines.

Substituting this expression for $S_m$ back into the above interference constraints leads to the condition $$\beta^2 \leq \theta \frac{\sigma_k^2}{\sum_{m \in L} |\tilde{R}_{km}|^2}.$$

We then can choose $\beta$ as large as possible, subject to this constraint for each full-power line k, along with the constraint $\beta^2 \leq 1$ (from the precoder row constraint requires $S_m \leq 1$). Applying the resulting scale values $S_L$ ensures that full-power lines are not degraded.

Full-to-full vectoring with power control may be accomplished by the access node 100, and in particular, the controller 130 of the access node 100 by executing program instructions stored in memory. Accordingly, the controller 130 is configured as a special purpose machine to:

1. Determine a precoder matrix C as in equation (4), with $S_F$ chosen using well-known methods to ensure that the row sums of squared elements of C do not exceed 1, and with $S_L$ chosen as described below to limit impact of low power lines on high power lines.
2. During time slots in which all lines are allowed to communicate, use precoder C to precode symbols from all lines. Transmit active or idle symbols on high power lines, and active or quiet symbols on low power lines.
3. During time slots in which only high power lines are allowed to communicate, use precoder C to precode symbols from all lines.

Then, the access node 100 transmits active or idle symbols on high power lines, and quiet symbols on low power lines.

In one embodiment, the controller 130 is configured to determine the power allocations $S_L$ for the low power lines by:

1. Calculating the corresponding threshold $\theta = 10^{SNR\_drop/10} - 1$, where SNR_drop is the largest acceptable decrease in SNR allowed on full-power lines due to crosstalk from low power lines. SNR_drop may be a design parameter determined through empirical study.
2. Computing or estimating the residual crosstalk matrix $\tilde{R} = RS^{-1} = HCS^{-1}$.

3. Computing the bound $$\psi_H = \min_{k \in H} \left\{ \frac{\theta \sigma_k^2}{\sum_{m \in L} |\tilde{R}_{km}|^2} \right\}.$$

4. Computing $\beta = \sqrt{\min\{\psi_H, 1\}}$.

5. For each low power line $m \in L$, let $S_m = \beta$.

Upstream Methods

The basic upstream model for one tone is:

$$y = Q(HSx + z) \quad (7)$$

where y is the received signal vector indicating the symbols received at the access node 100 over the lines 300, Q is an N×N postcoder (including the effect of FEQ), H is the N×N channel matrix, S is a diagonal power scaling matrix with values less than or equal to one, x is the signal vector indicating the symbols sent over the lines 300 from CPEs 200 (each element of the vector associated with a respective line in lines 300), and z is a noise vector. Again we represent by D the diagonal matrix of direct gains from the diagonal elements of H.

Symmetric (all-to-all) Vectoring

When all lines are active, we can (nearly optimally) use a MMSE postcoder $Q = SH^*(HS^2H^* + \Sigma)^{-1}$ where * denotes conjugate transpose and $\Sigma$ is the (typically diagonal) noise covariance of z. When the singular values of HS are much bigger than the noise, Q is close to the zero forcing postcoder $Q = (HS)^{-1}$, which results in $y = x + S^{-1}H^{-1}z$.

All to All vectoring may be accomplished by the access node 100, and in particular, the controller 130 of the access node 100 by executing program instructions stored in memory. Accordingly, the controller 130 is configured as a special purpose machine to:

1. Use identity scale S=I.
2. During time slots in which all lines are allowed to communicate, use N×N postcoder $Q' = H^{-1}$ to postcode symbols of all lines; and thus receive active or idle symbols on all lines in this case.
3. During time slots in which only high power lines are allowed to communicate, use F×F precoder postcoder $Q'' = H_{FF}^{-1}$ to postcode symbols of high power lines only; and thus receive active or idle symbols on high power lines, and ignored symbols on low power lines in this case.

Asymmetric Vectoring, with Power Control

When low power lines are present, we want to be able to turn off the receiver of a low power line during symbols for which the corresponding transmitter CPE is not transmitting a symbol. We will use the following terminology for symbols on line k (this terminology is analogous to that for asymmetric downstream vectoring, but expressed in terms of reception instead of transmission):

active symbol—symbol in which CPE k is transmitting a symbol idle symbol—symbol in which CPE k is not transmitting, but the receiver of line k is active for vectoring purposes ignored symbol—symbol in which CPE k is not transmitting, and receiver of line k is not active.

To save power on low power lines, we want to be able to use ignored symbols as much as possible, rather than idle symbols. If using symmetric precoding, we change the precoder matrix depending on the set of active lines for a given symbol. To avoid this, we can again consider using a form of asymmetric vectoring. Note that an ignored symbol corresponds to a zero column in the postcoder Q (whereas a quiet symbol corresponds to a zero row in precoder C). So for upstream, to facilitate ignored symbols, we enforce $Q_{FL} = 0$, and choose to protect full-powered lines from low powered lines through power control rather than vectoring.

For simplicity of notation and exposition, we will describe the zero forcing version of the postcoder Q. The MMSE version will be readily apparent to those skilled in the art. We define the postcoder or postcoding matrix Q of the form:

$$Q = \begin{bmatrix} Q_{FF} & Q_{FL} \\ Q_{LF} & Q_{LL} \end{bmatrix} \quad (8)$$

$$= \begin{bmatrix} S_F^{-1} H_{FF}^{-1} & 0 \\ S_L^{-1}[H^{-1}]_{LF} & S_L^{-1}[H^{-1}]_{LL} \end{bmatrix}$$

$$= \begin{bmatrix} S_F^{-1} H_{FF}^{-1} & 0 \\ -Q_{LL} H_{LF} H_F^{-1} & S_L^{-1}(H_{LL} - H_{LF} H_{FF}^{-1} H_{FL})^{-1} \end{bmatrix}$$

where $Q_{FF}$ represents the portion of the postcoder Q canceling or mitigating cross talk effect between full power lines, $Q_{FL}$ represents the portion of the postcoder Q canceling or mitigating the effect of low power lines on full or high power lines, $Q_{LF}$ represents the portion of the postcoder Q canceling or mitigating the effect of high power lines on low power lines, and $Q_{LL}$ represents the portion of the postcoder canceling or mitigating the effect of low power lines on low power lines. As will be appreciated, by setting $Q_{FL}$ to a zero matrix, the postcoder C does not cancel or mitigate the effect low power lines have on high power lines.

Note that for a postcoder, each row can be optimized independently of other rows, i.e. the performance of line k depends only on postcoder coefficients in that row. In this case, postcoder coefficients for rows corresponding to full power lines are optimized for the reduced size channel $H_{FF}S_F$ seen when low power lines are not active. Namely, the postcoder matrix Q cancels or mitigates the cross-talk effect on high power lines during the second slot type. The postcoder coefficients for rows corresponding to low power lines are optimized for the full channel HS seen when all lines are active. Namely, the postcoder matrix Q cancels or mitigates the cross-talk effect on low power lines during the first slot type.

The resultant channel is:

$$R = QHS = \begin{bmatrix} I & S_F^{-1} H_{FF}^{-1} H_{FL} S_L \\ 0 & I \end{bmatrix} \quad (9)$$

The receiver noise on line k is amplified by the sum of squares of elements of row k of the postcoder Q. For later convenience, we define $\eta_k^2$ to be the sum of squares of the normalized postcoder SQ, i.e., $$\eta_k^2 = S_k^2 \sum_m |Q_{km}|^2 \sigma_m^2.$$

In this notation, $\eta_k^2 S_k^{-2}$ is the amplified noise variance on line k. When the crosstalk channel is diagonally dominant, the noise variance is approximately $S^{-2}|D|^{-2}\sigma^2$, as in the case of symmetric vectoring.

Typically we take $S_F=I$ to obtain maximum performance on full-power lines. In order to maintain ideal performance on the full power lines in the presence of low power lines, the scaling matrix $S_L$ of the low power lines must be made sufficiently small to ensure that the squared row sums of $R_{FL}$ are "negligible" compared with the amplified noise.

We may set a positive threshold θ and choose the scaling matrix $S_L$ to ensure that $$\sum_{m \in L} |R_{km}|^2 \leq \theta \eta_k^2 S_k^{-2}$$

for each full powered line k, where the sum is taken over low powered lines m.

For such $S_L$, the noise plus interference on each full powered line will be no more than $(1+\theta)\eta_k^2 S_k^{-2}$, leading to a noise-to-signal ratio (NSR) increase of no more than 10 log 10 (1+θ) relative to the NSR obtained with $S_L=0$. Thus θ controls the difference in SNR on full-power lines on symbols with and without low power lines. To get an explicit expression in terms of $S_L$, we write $\tilde{R}=SRS^-$, so that the bound becomes $$\sum_{m \in L} |\tilde{R}_{km}|^2 S_m^2 \leq \theta \eta_k^2$$

for each k.

As was the case in all-to-all vectoring, there are different ways to select low power lines to meet the constraints above. Since all low power lines should meet the same target rate, and since, due to the structure of Q, it is desirable for all low power lines to use the same number of symbols per superframe, a sensible choice may be to equalize the performance of all low power lines upstream. Since there is no interference on low power lines, this means equalizing the amplified noise levels. This is done by $S_m = \beta \eta_m$ for all low power lines m, for some constant β. The general constraints on $S_L$ then reduce to a set of scalar constraints on β, namely:

$$\beta^2 \leq \theta \frac{\eta_k^2}{\sum_{m \in L} |\tilde{R}_{km}|^2 \eta_m^2} \quad (10)$$

for each full powered line k. The transmitter power constraint $S_m \leq 1$ at the transmitter also implies $\beta^2 \leq \eta_m^{-1}$ for each low powered line m. The best equal performance of all low powered lines is obtained using the maximum value of β satisfying these constraints. The SNR obtained on all low power lines is then 20 log 10β.

Operationally, the partially vectored low power modes work as follows. During a few symbols per superframe, all receiver ports are in use, receiving active and/or idle symbols. During the remaining symbols of the superframe, only the full-power receiver ports are active, and all low power lines ignore the symbols.

Figure 3:
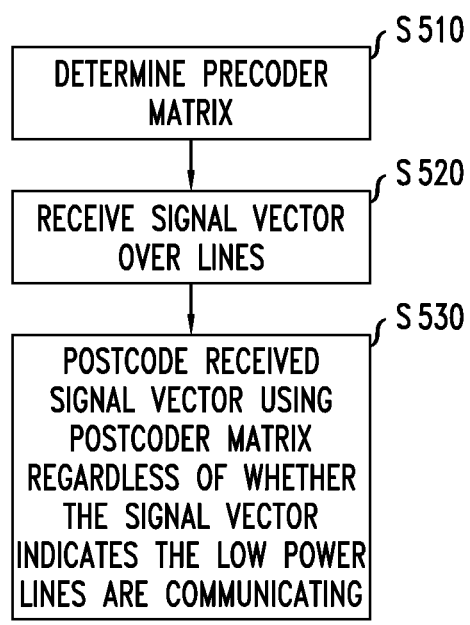
FIG. 3 illustrates a flow chart of upstream asymmetric vectoring, with power control, according to an embodiment.

FIG. 3 illustrates a flow chart of this upstream asymmetric vectoring, with power control, according to an embodiment. For the purposes of description only, this embodiment will be described with respect to implementation on the system of FIG. 1.

As shown, asymmetric vectoring on the upstream may be accomplished by the access node 100, and in particular, the controller 130 of the access node 100 by executing program instructions stored in the memory 140. Accordingly, the controller 130 is configured as a special purpose machine to:

1. Determine, in step S510, a postcoder matrix Q according to equation (8), with $S_F=I$ and with $S_L$ determined as described below with respect to FIG. 6. The controller 130 may store the postcoder matrix Q in the memory 140.
2. Receive a signal vector y' in step S520 over the lines 300 from the line drivers 135 and/or the processing devices 125. The signal vector y' indicating the symbols received over the lines 300 at a particular time slot.
3. Postcode, in step S530, the signal vector y' using the postcoder matrix Q to obtain an estimated received signal vector x'=Qy'; the postcoder matrix Q, or a submatrix thereof, used regardless of whether the signal vector y' indicates the low power lines are communicating. For example, during time slots (first type) in which all lines are allowed to communicate, the controller 130 uses postcoder matrix Q, in step S530, to postcode symbols from all lines. As another example, during time slots (second type) in which only high power lines are allowed to communicate, the controller 130 uses the submatrix $Q_{FF}$ of postcoder matrix Q to postcode symbols from high power lines.

Figure 4:
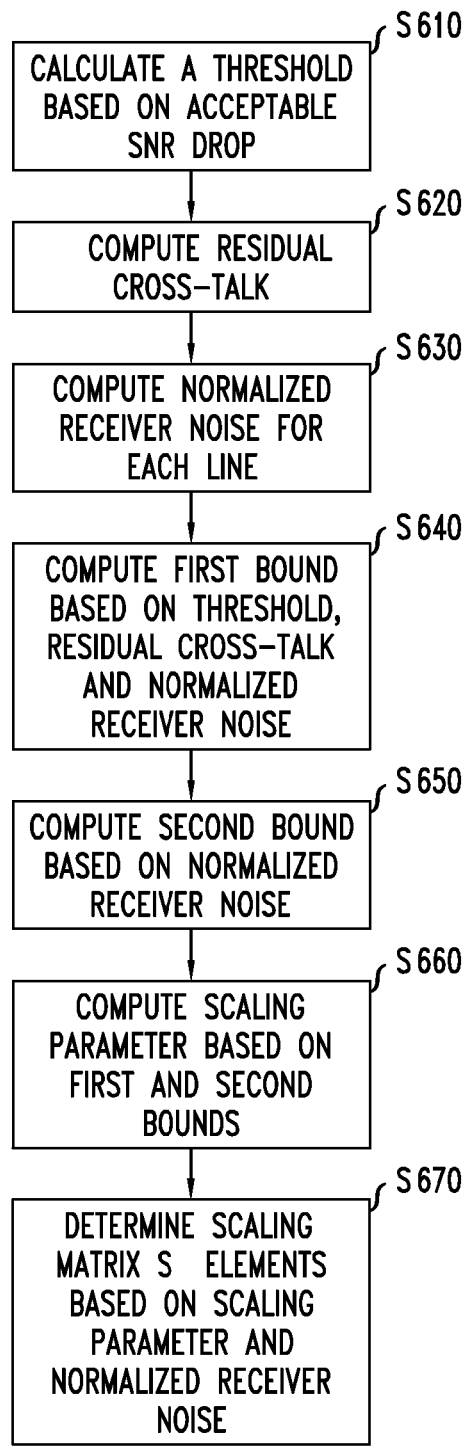
FIG. 4 illustrates a flow chart of a method for choosing power allocations for the low power lines in the method of FIG. 3 according to an example embodiment.

FIG. 4 illustrates a method for choosing the power allocations $S_L$ for the low power lines in cooperation with the method of FIG. 3 according to an example embodiment. As shown, the controller 130 is configured to:

1. Calculate a threshold $\theta=10^{SNR\_drop/10}-1$ in step S610, where SNR_drop is the largest acceptable decrease in SNR allowed on full-power lines due to crosstalk from low power lines. SNR_drop may be a design parameter determined through empirical study.
2. Compute or estimate the residual crosstalk matrix $\tilde{R}=SRS^{-1}=SQH$ in step S620.
3. For each line k∈F∪L, in step S630 compute the normalized receiver noise $$\eta_k^2 = S_k^2 \sum_m |Q_{km}|^2 \sigma_m^2$$

4. Compute, in step S640, the first bound $$\psi_H = \min_{k \in H} \left\{ \frac{\theta \eta_k^2}{\sum_{m \in L} |\tilde{R}_{km}|^2 \eta_m^2} \right\}.$$

5. Compute, in step S650, the second bound $$\psi_L = \min_{m \in L} \{\eta_m^{-1}\}.$$

6. Compute scaling parameter $\beta = \sqrt{\min\{\psi_H, \psi_L\}}$ in step S660.
7. For each low power line m∈L, set $S_m = \beta \eta_m$ in step S670.

As will be appreciated, with asymmetric vectoring, only a single postcoder matrix is computed and stored. The single postcoder matrix is used for (i) slots in which all lines communicate and (ii) a submatrix is used for slots in which only high or full power lines communicate. Namely, regardless of whether the received signal vector includes active, idle or quiet symbols over the low power lines, the same single postcoder matrix, or a submatrix thereof, is used. Accordingly, asymmetric vectoring requires significantly less memory and significantly less computation resources to implement.

Full-to-Full Vectoring, with Power Control

An alternative scheme is not to vector low power lines at all (i.e., to also set $Q_{LF}$ to zero and make $Q_{LL}$ diagonal). This is represented by postcoder:

$$Q = \begin{bmatrix} Q_{FF} & Q_{FL} \\ Q_{LF} & Q_{LL} \end{bmatrix} = \begin{bmatrix} S_F^{-1} H_{FF}^{-1} & 0 \\ 0 & S_L^{-1} D_L^{-1} \end{bmatrix} \quad (11)$$

with resultant channel $$R = QHS = \begin{bmatrix} I & S_F^{-1} H_{FF}^{-1} H_{FL} S_L \\ S_L^{-1} D_L^{-1} H_{LF} S_F & S_L^{-1} D_L^{-1} H_{LL} S_L \end{bmatrix} = S^{-1} \bar{R} S \quad (12)$$

Possible motivation for such a scheme would be simplicity (not requiring vector processing on low power lines) and also the ability to support discontinuous operation of low power lines.

As before, scale values $S_L$ that limit the negative impact of low power lines on full-power lines are determined. Also, it is desirable to roughly equalize the performance of low power lines. The task of equalizing performance is more difficult in this case due to interference between low power lines. A simple approach is to note that the NSR on the low power line m can be bounded as:

$$|R_{mm} - 1|^2 + \sum_{n \neq m} |R_{mn}|^2 + |Q_{mm}|^2 \sigma_m^2 \leq S_m^{-2} v_m^2 \quad (13)$$

where $$v_m^2 = |\bar{R}_{mm} - 1|^2 + \sum_n |\bar{R}_{mn}|^2 + |D_m|^{-2} \sigma_m^2 \quad (14)$$

We can equalize the upper bound on NSR across lines by taking $S_m = \beta v_m$ for some constant $\beta$.

Substituting this expression for $S_m$ back into the desired bound $$\sum_{m \in L} |\bar{R}_{km}|^2 S_m^2 \leq \theta \eta_k^2$$

derived above, we obtain the condition $$\beta^2 \leq \theta \frac{\eta_k^2}{\sum_{m \in L} |\bar{R}_{km}|^2 v_m^2}.$$

We then can choose $\beta$ as large as possible, subject to this constraint for each full-power line k and the constraint $\beta^2 \leq v_m^{-1}$ for each low power line m. Applying the resulting scale values $S_L$ ensures that full-power lines are not degraded, while roughly equalizing the performance of the low power lines.

Full-to-full vectoring, with power control, on the upstream may be accomplished by the access node 100, and in particular, the controller 130 of the access node 100 by executing program instructions stored in memory. Accordingly, the controller 130 is configured as a special purpose machine to:

1. Determine a postcoder matrix Q according to equation (11), with $S_F = I$ and with $S_L$ as described below to limit the impact of low power lines on high power lines.
2. During time slots in which all lines are allowed to communicate, use postcoder Q to precode symbols from all lines; and thus, receive active or idle symbols on high power lines, and active or ignored symbols on low power lines.
3. During time slots in which only high power lines are allowed to communicate, use submatrix $Q_{FF}$ of postcoder Q to precode symbols from high power lines only; and thus receive active or idle symbols on high power lines, and ignored symbols on low power lines.

In a method for choosing the power allocations $S_L$ for the low power lines according to an example embodiment, the controller 130 is configured to:

1. Calculating the corresponding threshold $\theta = 10^{SNR\_drop/10} - 1$, where SNR$^+$ drop is the largest acceptable decrease in SNR allowed on full-power lines due to crosstalk from low power lines. SNR_drop may be a design parameter determined through empirical study.
2. Compute or estimate the residual crosstalk matrix $\tilde{R} = SRS^{-1} = SQH$.
3. For each high power line k∈H, compute the normalized receiver noise $$\eta_k^2 = S_k^2 \sum_m |Q_{km}|^2 \sigma_m^2$$

and for each low power line m∈L, compute the bound on normalized receiver noise $$v_m^2 = |\bar{R}_{mm} - 1|^2 + \sum_n |\bar{R}_{mn}|^2 + |D_m|^{-2} \sigma_m^2.$$

4. Compute the bound $$\psi_H = \min_{k \in H} \left\{ \frac{\theta \eta_k^2}{\sum_{m \in L} |\bar{R}_{km}|^2 v_m^2} \right\}.$$

5. Compute the bound $$\psi_L = \min_{m \in L} \{v_m^{-1}\}.$$

6. Compute $\beta = \sqrt{\min\{\psi_H, \psi_L\}}$.
7. For each low power line m∈L, let $S_m = \beta v_m$.

The invention being thus described, it will be obvious that the same may be varied in many ways. Such variations are not to be regarded as a departure from the invention, and all such modifications are intended to be included within the scope of the invention.

We claim:

1. A method of transmitting, comprising:
   determining, at an access node, a precoder matrix for precoding transmission from the access node to a plurality of downstream devices over a plurality of lines, the plurality of lines including high power lines and low power lines, the high power lines being in active communication and transmitting more symbols per frame than the low power lines;
   precoding a signal vector using the precoder matrix regardless of the symbols the signal vector is sending over the low power lines, and the determining determines the precoder matrix such that the precoding does not mitigate the cross-talk effect the high power lines have on the low power lines; and
   transmitting over the plurality of lines based on the precoded signal vector.

2. The method of claim 1, wherein precoding uses the precoder matrix for both a first slot type and a second slot type, the first slot type being a time slot of a frame during which high power and low power lines in the plurality of lines are permitted to communicate, and the second slot type being a time slot of the frame during which high power lines only are permitted to communicate.

3. The method of claim 2, wherein the determining determines the precoder matrix such that the precoding does not mitigate the cross-talk effect the low power lines have on each other.

4. The method of claim 2, wherein the determining determines the precoder matrix such that the precoding mitigates the cross-talk effect the low power lines have on the high power lines, and mitigates the cross-talk effect the high power lines have on each other.

5. The method of claim 1, wherein the determining determines the precoder matrix such that the precoding does not mitigate the cross-talk effect the low power lines have on each other.

6. The method of claim 1, wherein the determining determines the precoder matrix such that the precoding mitigates the cross-talk effect the low power lines have on the high power lines, and mitigates the cross-talk effect the high power lines have on each other.

7. An access node, comprising:
   a memory configured to store a precoder matrix; and
   a controller configured to determine the precoder matrix for precoding transmission from the access node to a plurality of downstream devices over a plurality of lines, the plurality of lines including high power lines and low power lines, the high power lines being in active communication and transmitting more symbols per frame than the low power lines;
   the controller configured to precode a signal vector using the precoder matrix regardless of the symbols the signal vector is sending over the low power lines, and to transmit over the plurality of lines based on the precoded signal vector, and the controller is configured to determine the precoder matrix such that the precoding does not mitigate the cross-talk effect the high power lines have on the low power lines.

* * * * *